United States Patent
Sonoda

(10) Patent No.: US 8,514,300 B2
(45) Date of Patent: Aug. 20, 2013

(54) IMAGING APPARATUS FOR REDUCING DRIVING NOISE

(75) Inventor: Keita Sonoda, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 121 days.

(21) Appl. No.: 12/945,651

(22) Filed: Nov. 12, 2010

(65) Prior Publication Data

US 2011/0141343 A1   Jun. 16, 2011

(30) Foreign Application Priority Data

Dec. 14, 2009 (JP) ................................ 2009-283452
Mar. 12, 2010 (JP) ................................ 2010-056195

(51) Int. Cl.
*H04N 5/225* (2006.01)
*H04N 5/76* (2006.01)
*G03B 17/24* (2006.01)

(52) U.S. Cl.
USPC ............... 348/231.4; 348/207.99; 348/231.3; 396/312

(58) Field of Classification Search
USPC .................. 348/207.99, 211.4, 211.5, 211.6, 348/231.2, 231.3, 231.4, 231.5, 231.6, 239, 348/241, 374, 375; 396/283, 310, 312; 381/26, 381/56, 57, 58, 71.1, 94.1, 104
See application file for complete search history.

(56) References Cited

U.S. PATENT DOCUMENTS

| 6,654,054 B1* | 11/2003 | Embler .......................... 348/241 |
| 7,596,231 B2* | 9/2009 | Samadani ..................... 381/94.2 |
| 2004/0032509 A1* | 2/2004 | Owens et al. ............... 348/222.1 |
| 2006/0132624 A1* | 6/2006 | Yuyama ........................ 348/241 |
| 2009/0066798 A1* | 3/2009 | Oku et al. ................. 348/207.99 |

FOREIGN PATENT DOCUMENTS

JP   6-292048 A   10/1994

* cited by examiner

*Primary Examiner* — Chieh M Fan
*Assistant Examiner* — Peter Chon
(74) *Attorney, Agent, or Firm* — Canon U.S.A., Inc. IP Division

(57) ABSTRACT

An imaging apparatus including a driving portion configured to move an optical system for acquiring an image of an object collects ambient sound to acquire an audio signal, and detects a level of the audio signal. Based on a detection result, the imaging apparatus adjusts the level of the audio signal and outputs the adjusted audio signal. When the driving portion is not driven, the imaging apparatus adjusts the level of the audio signal after adjustment to be lower as the level of the detection result is lower. When the driving portion is driven, the imaging apparatus sets the level of the audio signal after adjustment to be lower than that when the driving portion is not driven.

33 Claims, 5 Drawing Sheets

ALC DIAGRAM INPUT-OUTPUT

ALC DIAGRAM INPUT-GAIN

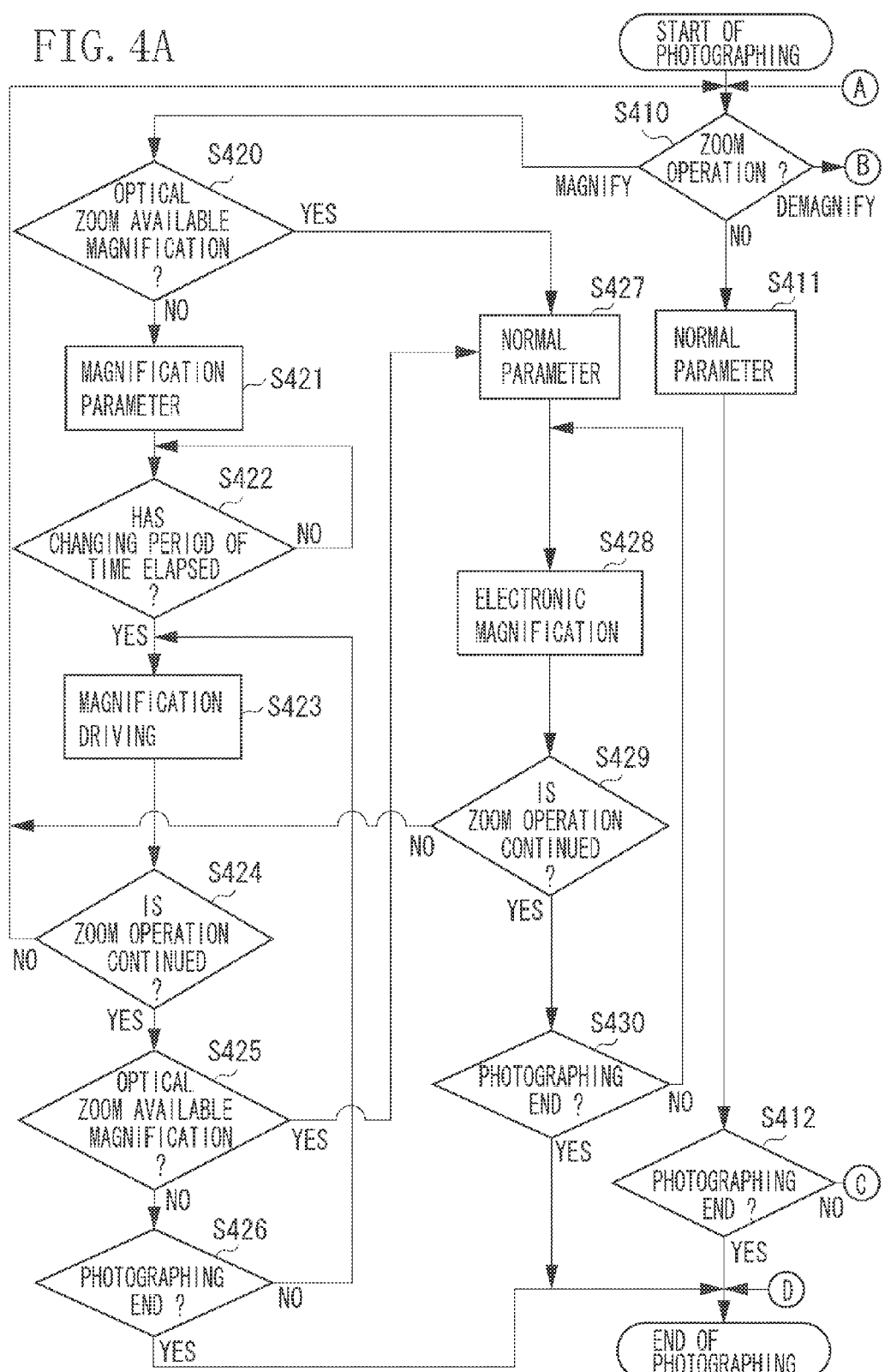

IMAGING APPARATUS FOR REDUCING DRIVING NOISE

BACKGROUND OF THE INVENTION

1. Field of the Invention

The present invention relates to an imaging apparatus and, more particularly, to an imaging apparatus capable of reducing sound (driving noise) generated during driving of a driving portion.

2. Description of the Related Art

There has conventionally been known an imaging apparatus for recording an image signal and an audio signal. For example, Japanese Patent Application Laid-Open No. 6-292048 discusses an imaging apparatus that reduces sound (driving noise) generated by a driving portion, such as a motor for moving a lens during movement of the lens provided or installed in the apparatus.

In such a conventional method, the audio signal is attenuated by a certain level (gain down) during driving of the driving portion. Thus, even when a volume of ambient sound is large, and an influence of the sound (driving noise) generated by the driving of the driving portion is not so distinctive, the audio signal is attenuated by a certain level. In consequence, the volume of the ambient sound becomes small during driving of the driving portion, thus giving uncomfortable feeling to a user.

SUMMARY OF THE INVENTION

According to an aspect of the present invention, an imaging apparatus including a driving portion configured to move an optical system for acquiring an image of an object includes an imaging unit configured to acquire an image signal by capturing the acquired image, a sound collecting unit configured to acquire an audio signal by collecting ambient sound, an adjustment unit configured to adjust a level of the audio signal by giving a gain according to the level of the audio signal to the audio signal and to output the adjusted audio signal, a driving unit configured to drive the driving portion, and a control unit configured to control the adjustment unit according to whether the driving unit is driving the driving portion. The control unit controls the adjustment unit to set the gain given when the driving unit is not driving the driving portion lower than that given when the driving unit is driving the driving portion, and to set a difference between the gain given when the driving unit is driving the driving portion and that given when the driving unit is not driving the driving portion greater as the level of the audio signal is lower.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIGS. 4A and 4B are flowcharts illustrating moving image photographing processing by a control unit according to the exemplary embodiment of the present invention.

DESCRIPTION OF THE EMBODIMENTS

Various exemplary embodiments, features, and aspects of the invention will be described in detail below with reference to the drawings.

Figure 1:
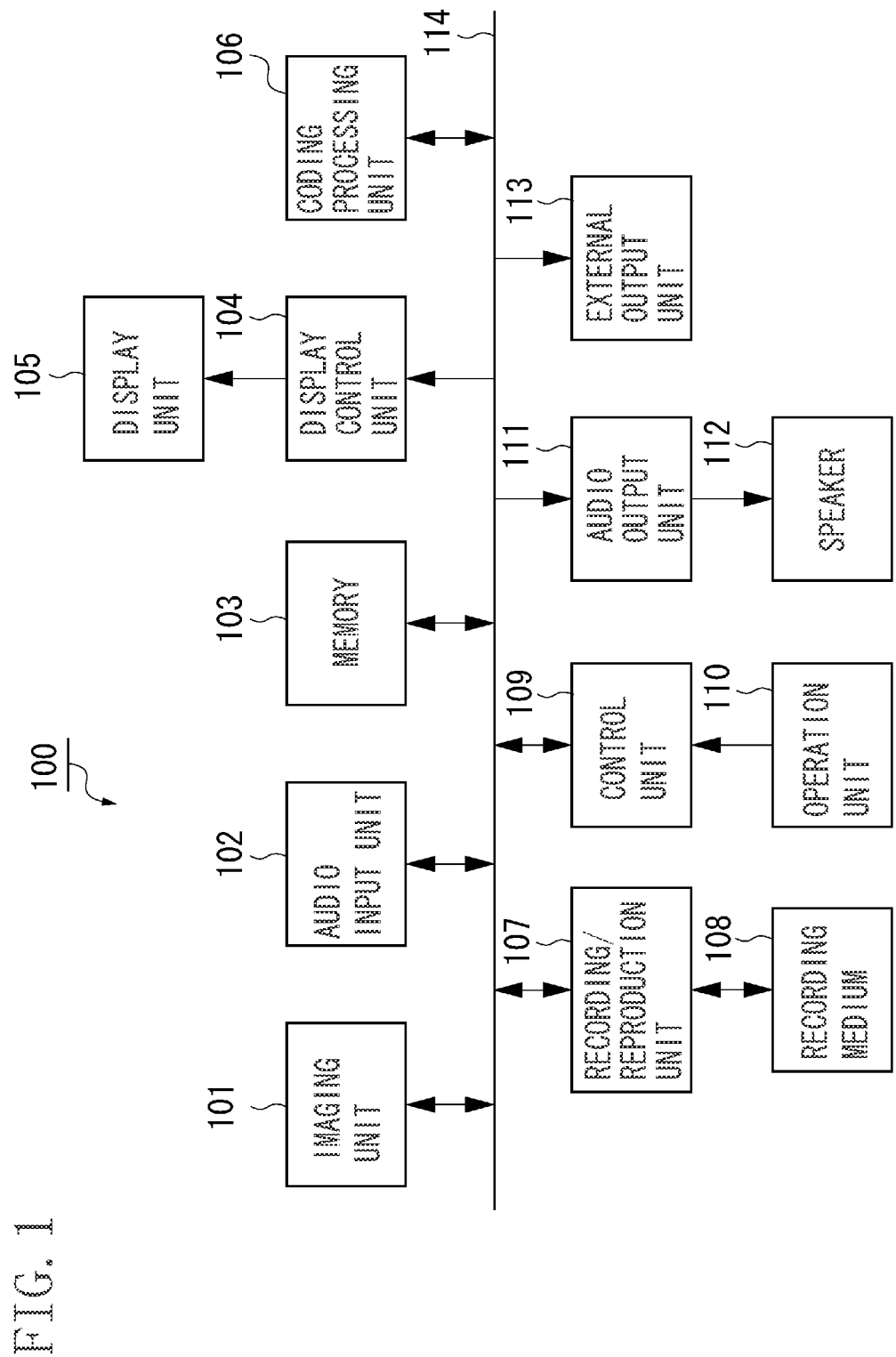
FIG. 1 is a block diagram illustrating an imaging apparatus according to an exemplary embodiment of the present invention.

FIG. 1 is a block diagram illustrating a configuration of an imaging apparatus 100 according to an exemplary embodiment of the present invention.

In FIG. 1, an imaging unit 101 converts an optical image of an object captured by a photographic lens into an image signal by an image sensor, and performs analog-digital conversion and image adjustment processing to generate image data. The photographic lens may be a built-in lens or a detachable lens. The image sensor may be a photoelectric conversion element, such as a charge-coupled device (CCD) or a complementary metal-oxide semiconductor (CMOS).

An audio input unit 102 collects ambient sound around the imaging apparatus 100 by a microphone built in or connected via an audio terminal, and performs analog-digital conversion or audio processing to generate audio data. Both types of directional and nondirectional microphones can be used. In the present exemplary embodiment, the nondirectional microphone is used. A memory 103 temporarily stores image data acquired by the imaging unit 101 and audio data acquired by the audio input unit 102. A display control unit 104 displays a video relating to the image data acquired by the imaging unit 101, an operation screen of the imaging apparatus 100, or a menu screen on a display unit 105 or an external display via a video terminal (not illustrated).

A coding processing unit 106 reads the image data and the audio data temporarily stored in the memory 103, and performs predetermined coding to generate compressed image data and compressed audio data. The audio data may not be subjected to compression. The compressed image data may be generated by using any compression method such as Motion Picture Experts Group (MPEG) 2 or H.264/MPEG 4-AVC. The compressed audio data may be generated by using any compression method, such as Automatic Control (AC) 3, Adaptive Audio Coding (AAC), Adaptive TRansform Acoustic Coding (ATRAC), or Adaptive Differential Pulse Code Modulation (ADPCM).

A recording/reproduction unit 107 records the compressed image data, the compressed audio data or audio data, or various data generated by the coding processing unit 106 on a recording medium 108, or reads the data from the recording medium 108. For the recording medium 108, any type of a recording medium, such as a magnetic disk, an optical disk or a semiconductor memory, can be used as long as image data or audio data can be recorded.

A control unit 109 can control each block of the imaging apparatus 100 by transmitting a control signal to the block, and includes a central processing unit (CPU) or a memory. The memory used in the control unit 109 is a read-only memory (ROM) for storing various control programs or a random access memory (RAM) for calculation processing, and an external memory of the control unit 109 is included. An operation unit 110 includes a button or a dial, and transmits an instruction signal to the control unit 109 according to a user's operation. In the imaging apparatus according to the present exemplary embodiment, the operation unit 110 includes a shooting button for instructing a start or an end of moving image recording, a zoom lever for instructing optical or electronic magnification/demagnification of an image, a numeric keypad for various adjustments, and a determination key.

An audio output unit 111 outputs the audio data or the compressed audio data reproduced by the recording/reproduction unit 107, or audio data output from the control unit 109 to a speaker 112 or the audio terminal. An external output unit 113 outputs the compressed video data, the compressed audio data, or the audio data reproduced by the recording/reproduction unit 107 to an external device. A data bus 114 is used for supplying various data, such as audio data or image data, and various control signals to each block of the imaging apparatus 100.

An ordinary operation of the imaging apparatus 100 according to the present exemplary embodiment will be described.

When a user operates the operation unit 110 to issue an instruction for turning power ON, the imaging apparatus 100 according to the present exemplary embodiment supplies power to each block of the imaging apparatus 110 from a power supply unit (not illustrated).

Having received power, the control unit 109 checks which of modes, such as a photographing mode and a reproduction mode, a mode changing switch of the operation unit 110 is in based on an instruction signal from the operation unit 110. In a moving image recording mode, the image data acquired by the imaging unit 101 and the audio data acquired by the audio input unit 102 are stored as one file. In the reproduction mode, the compressed image data recorded on the recording medium 108 is reproduced by the recording/reproduction unit 107 to be displayed on the display unit 105.

In the moving image recording mode, first, the control unit 109 transmits a control signal to each block of the imaging apparatus 100 to change to a photographing standby state, and causes the block to perform the following operation.

The imaging unit 101 converts the optical image of the object captured by the photographic lens into an image signal, and performs analog-digital conversion or image adjustment processing to generate image data. The imaging unit 101 transmits the acquired image data to the display control unit 104 to display the image data on the display unit 105. The user prepares photographing while viewing the screen thus displayed.

The audio input unit 102 converts analog audio signals acquired by a plurality of microphones into digital audio signals. The audio input unit 102 processes the plurality of acquired digital audio signals to generate multi-channel audio data. The acquired audio data is transmitted to the audio output unit 111, and output as sound from the connected speaker 112 or an earphone (not illustrated). The user can adjust a manual volume to determine a recording volume while listening to the sound thus output.

Then, the user operates a recording button of the operation unit 110 to transmit an instruction signal of a photographing start to the control unit 109. Having received the instruction signal, the control unit 109 transmits the instruction signal of the photographing start to each block of the imaging apparatus 100, and causes the block to perform the following operation.

The imaging unit 101 converts the optical image of the object captured by the photographic lens into an image signal by the image sensor, and performs analog-digital conversion or image adjustment processing to generate image data. The imaging unit 101 transmits the acquired image data to the display processing unit 104 to display the image data on the display unit 105. The acquired image data is transmitted to the memory 103.

The audio input unit 102 converts analog audio signals acquired by the plurality of microphones into digital audio signals, and processes the plurality of acquired digital audio signals to generate multi-channel audio data. The acquired audio data is transmitted to the memory 103. In the case of a single microphone, an acquired analog audio signal is converted into a digital audio signal to generate audio data. The audio data is transmitted to the memory 103.

The coding processing unit 106 reads the image data and the audio data temporarily stored in the memory 103, and performs predetermined coding to generate compressed image data and compressed audio data.

The control unit 109 combines the compressed image data and the compressed audio data to form a data stream, and outputs the data stream to the recording/reproduction unit 107. When the audio data is not compressed, the control unit 109 combines the audio data and the compressed image data stored in the memory 103 to form a data stream, and outputs the data stream to the recording/reproduction unit 107.

The recording/reproduction unit 107 writes the data stream as one moving image file into the recording medium 108 under file system management such as Universal Disk Format (UDF) or File Allocation Table (FAT).

The above operation is continued during photographing.

Then, the user operates the recording button of the operation unit 110 to transmit an instruction signal of a photographing end. Having received the instruction signal, the control unit 109 transmits the instruction signal of the photographing end to each block of the imaging apparatus 100, and causes the block to perform the following operation.

The imaging unit 101 and the audio input unit 102 stop the generation of the image data and the audio data.

The coding processing unit 106 reads the image data and the audio data left in the memory to perform predetermined coding, and stops the operation when generation of compressed image data and compressed audio data is completed. When the audio data is not compressed, needless to say, the operation is stopped when generation of compressed image data is completed.

The control unit 109 combines the last compressed image data and the last compressed audio data or the audio data to form a data stream, and outputs the data stream to the recording/reproduction unit 107.

The recording/reproduction unit 107 writes the data stream as one moving image file into the recording medium 108 under the file system management such as UDF or FAT. When supplying of the data stream is stopped, the recording/reproduction unit 107 completes a moving image file, and stops the recording operation.

After the recording operation has been stopped, the control unit 109 transmits a control signal to each block of the imaging apparatus 100 so as to change to a photographing standby state, and returns to the photographing standby state.

In the reproduction mode, the control unit 109 transmits a control signal to each block of the imaging apparatus 100 so as to change to a reproduction state, and causes the block to perform the following operation.

The recording/reproduction unit 107 reads the moving image file containing the compressed image data and the compressed audio data recorded on the recording medium 108, and transmits the read compressed image data and compressed audio data to the coding processing unit 106.

The coding processing unit 106 decodes the compressed image data and the compressed audio data to transmit the decoded data to the display control unit 104 and the audio output unit 111.

The display control unit 104 displays the decoded image data on the display unit 105.

The audio output unit 111 outputs the decoded audio data from a built-in or attached external speaker.

As described above, the imaging apparatus 100 according to the present exemplary embodiment can perform image and audio recording/reproduction.

In the present exemplary embodiment, when acquiring an audio signal, the audio input unit 102 performs level adjustment processing on the audio signal acquired by the microphone. This processing may be performed after the imaging apparatus 100 is activated, after a photographing mode is selected, or after a mode relating to sound recording is selected. In the mode relating to sound recording, the above processing may be performed according to a start of sound recording. In the present exemplary embodiment, the above processing is performed at timing of starting moving image photographing.

Figure 2:
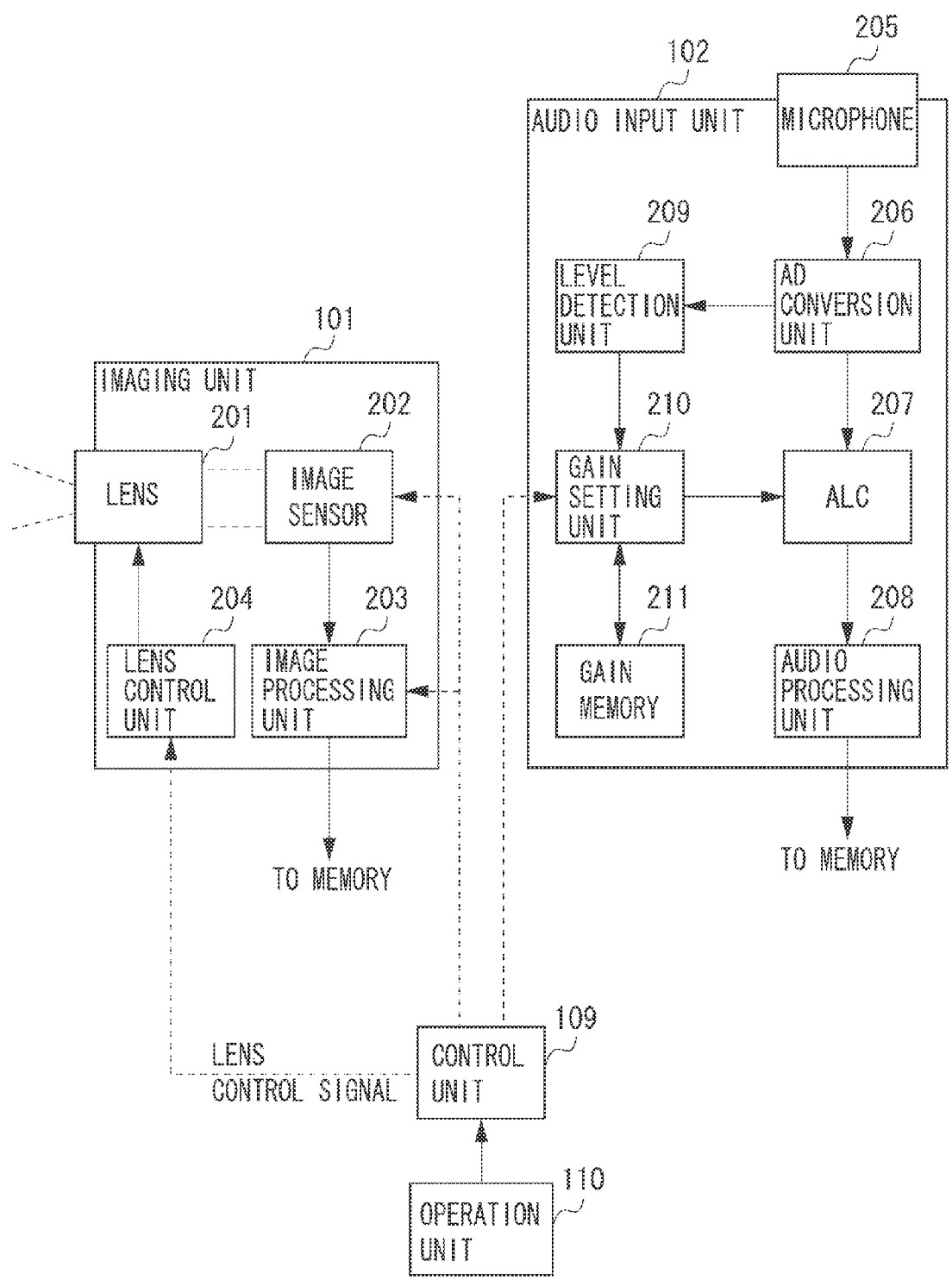
FIG. 2 is a block diagram illustrating a detailed configuration of an imaging unit and an audio input unit according to the exemplary embodiment of the present invention.

Referring to FIG. 2, detailed functions and operations of the imaging unit 101 and the audio input unit 102 of the imaging apparatus 100 according to the present exemplary embodiment will be described.

The imaging unit 101 includes an optical system such as a lens 201 for capturing an optical image of an object, and an image sensor 202 for converting the optical image of the object captured by the lens 201 into an electric signal (image signal). The imaging unit 101 further includes an image processing unit 203 for converting the analog image signal acquired by the image sensor 202 into a digital image signal, performing image quality adjustment processing to generate image data, and transmitting the image data to the memory. The imaging unit 101 further includes a lens control unit 204 having a driving mechanism, such as a position sensor and a motor, for moving the lens 201. In the present exemplary embodiment, the lens 201 and the lens control unit 204 are built in the imaging unit 101. However, these components may be a detachable interchangeable lens.

For example, when the user operates the operation unit 110 to enter an instruction for a zoom operation or focus adjustment, the control unit 109 transmits a control signal (driving signal) for moving the lens 201 to the lens control unit 204. The lens control unit 204 checks, based on the control signal, a position of the lens 201 by the position sensor to move the lens 201 by a driving portion, such as a motor. In the case of checking an image acquired by the image processing unit 203 or a distance from the object to perform automatic adjustment, the control unit 109 transmits a control signal for driving the lens 201. If the imaging apparatus 100 has an image stabilizing function to prevent image shaking, the control unit 109 transmits a control signal for moving the lens 201 to the lens control unit 204 based on vibrations detected by a vibration sensor (not illustrated).

In this case, in the imaging apparatus 100 according to the present exemplary embodiment, driving noise may be generated due to movement of the lens 201, or driving noise may be generated by the motor for moving the lens 201. In the present exemplary embodiment, based on the control signal for driving the lens 201 from the control unit 109, the lens control unit 204 drives the lens 201. More specifically, the control unit 109 can know (detect or determine) timing of generation of driving noise.

In the present exemplary embodiment, for example, the lens 201 can optically perform magnification/demagnification of six times at the maximum and one time at the minimum. In the present exemplary embodiment, this processing is referred to as optical zooming. In the optical zooming, the lens control unit 204 moves the lens 201 according to an instruction from the control unit 109, thereby magnifying the optical image of the object. The image processing unit 203 includes an electronic zoom (magnification) function for outputting an image signal resulting from magnification of a part of the image signal acquired by the image sensor 202. The image processing unit 203 further includes an electronic zoom (demagnification) function for widening a range of image acquired by the image sensor 202 and outputting an image signal having an image size demagnified by the image processing unit 203.

The audio input unit 102 includes a microphone 205 for converting sound vibration into an electric signal to output an audio signal, and an AD version unit 206 for converting the analog audio signal acquired by the microphone 205 into a digital audio signal. The audio input unit 102 further includes an automatic level controller (ALC) 207 for controlling the amplitude of the audio signal to a predetermined level, and an audio processing unit 208 for performing predetermined processing on the audio signal to generate audio data, and transmitting the audio data to the memory 103.

The audio input unit 12 further includes a level detection unit 209 for detecting a level of the digital audio signal to output a detection result, and a gain setting unit 210 for setting a gain (amplification rate) in the ALC 207 based on the detection result by the level detection unit 209. The level of the audio signal indicates a peak value obtained during the time from when the audio signal is converted into an absolute value to set amplitude almost to zero to when the amplitude becomes almost zero next time. The audio input unit 102 further includes a gain memory 211 for storing a parameter to determine a gain to be set in the ALC 207 by the gain setting unit 210 based on the detection result by the level detection unit 209.

The parameter recorded on the gain memory 211 indicates, for example, an output level (a correspondence relationship illustrated in FIG. 3A or 3B described below) corresponding to the level of the audio signal input to the ALC 207. The parameter may indicate a gain given to an input signal corresponding to the level of the audio signal input to the ALC 207. The gain setting unit 210 sets, in the ALC 207, a gain (amplification rate or attenuation rate) corresponding to the level of the audio signal input to the ALC 207 according to the parameter stored in the gain memory 211. In the present exemplary embodiment, for example, the gain memory 211 has a "magnification parameter" corresponding to movement of the lens 201 for magnifying the optical image of the object (magnification driving, hereinafter). The gain memory 211 has a "demagnification parameter" corresponding to movement of the lens 201 for demagnifying the optical image of the object (demagnification driving, hereinafter).

In the present exemplary embodiment, the case where the lens 201 is moved has been described. However, different parameters may be set for other driving portions, and similar processing may be performed. The gain memory 211 has also a normal parameter for a case where any driving portion including the lens 201 is not driven.

Figure 3A:
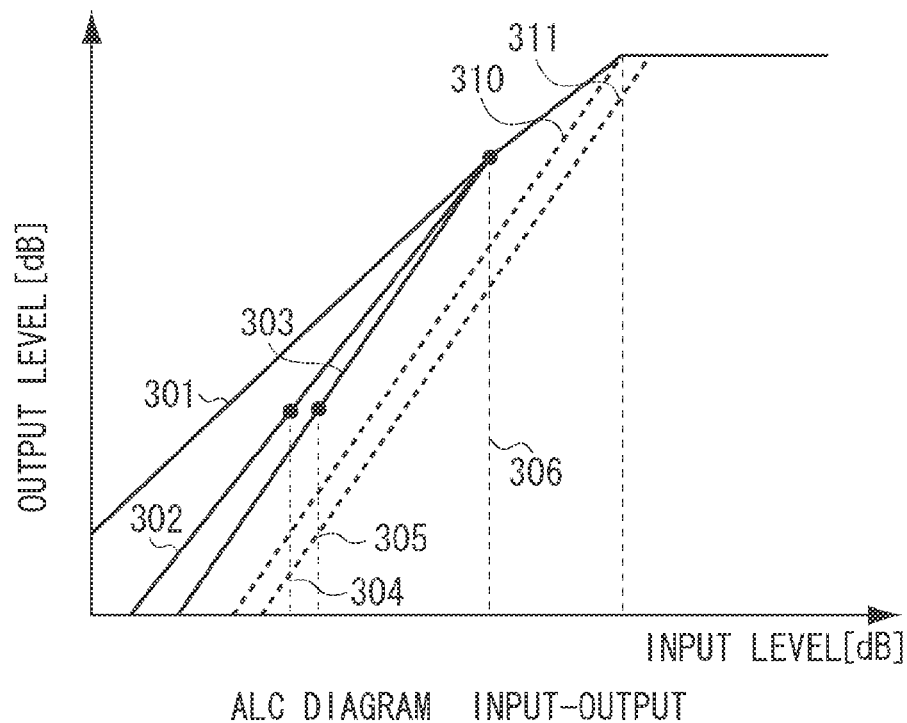
FIGS. 3A and 3B are automatic level controller (ALC) diagrams illustrating an ALC according to the exemplary embodiment of the present invention.
Figure 3B:
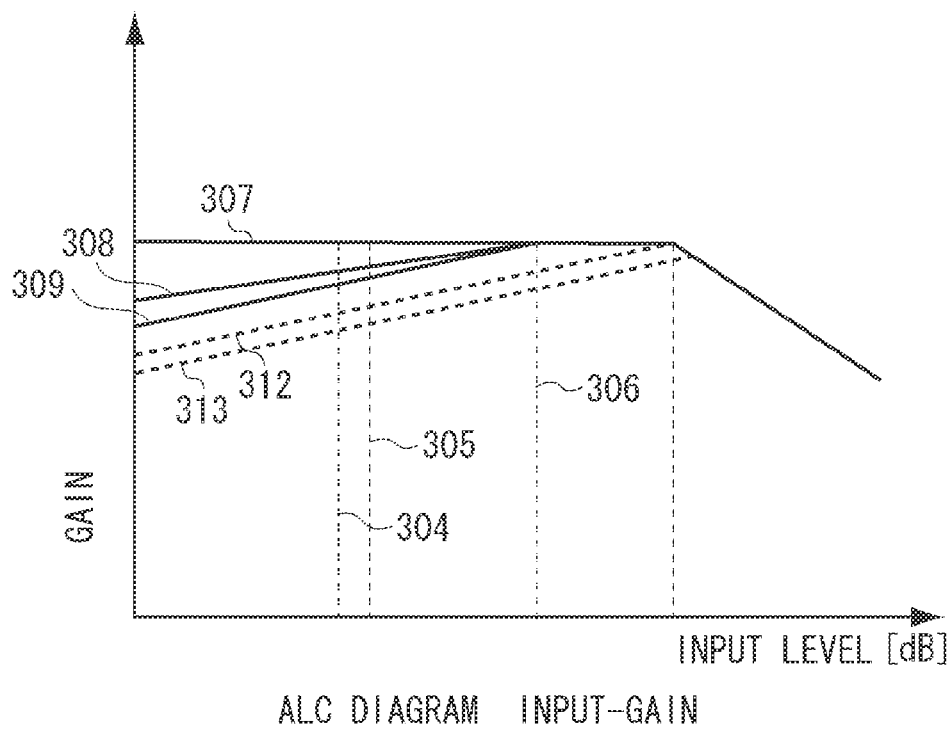

Each of FIGS. 3A and 3B illustrates an output level corresponding to a level of an audio signal input to the ALC 207 or a gain given to an input signal corresponding to the level of the input audio signal for each parameter of the gain memory 211. FIG. 3A illustrates a correspondence relationship between the level of the audio signal input to the ALC 207 and a level of an audio signal output corresponding to the input level. FIG. 3B illustrates a correspondence relationship between the level of the audio signal input to the ALC 207 and a gain set in the ALC 207 corresponding to the input level. In the present exemplary embodiment, these figures are referred to as ALC diagrams.

In FIG. 3A, the horizontal axis indicates the level of an audio signal input to the ALC 207, and the vertical axis indicates the level of an audio signal output corresponding to the level of the input audio signal. In FIG. 3B, the horizontal axis indicates the level of an audio signal input to the ALC 207, and the vertical axis indicates a gain set in the ALC 207 corresponding to the level of the input audio signal.

The gain memory 211 stores parameters for forming such ALC diagrams. For example, an ALC diagram corresponding to a normal parameter (parameter when no driving portion is driven) of the gain memory 211 illustrates a correspondence relationship 301 between an input level and an output level, and a correspondence relationship 307 between an input level and a gain. An ALC diagram corresponding to magnification driving (magnification parameter) of the lens 201 illustrates a correspondence relationship 302 between an input level and an output level, and a correspondence relationship 308 between an input level and a gain. An ALC diagram corresponding to demagnification driving (demagnification parameter) of the lens 201 illustrates a correspondence relationship 303 between an input level and an output level, and a correspondence relationship 309 between an input level and a gain.

In order to form. ALC diagrams, for example, the gain memory 211 stores a plurality of points indicating output levels corresponding to input levels as parameters. The gain memory 211 stores, for example, table data indicating the output levels corresponding to the input levels. For example, the gain memory 211 stores a plurality of points indicating gains corresponding to the input levels as parameters. The gain memory 211 stores, for example, table data indicating gains corresponding to the input levels.

According to the ALC diagram, in the present exemplary embodiment, for example, an audio signal of 60 dB is output when no driving portion is driven with respect to an input audio signal of 60 dB. However, during magnification driving of the lens 201, an output audio signal of 56 dB is output. During demagnification driving, an output audio signal of 52 dB is output.

In FIGS. 3A and 3B, a broken line 304 indicates an input level of an audio signal corresponding to driving noise generated by movement of the lens 201 or a driving portion such as a motor for moving the lens 201 during magnification driving of the lens 201. For example, the level is 50 dB. More specifically, during the magnification driving, an audio signal of a level of at least 50 dB at the lowest is input. During the magnification driving, the ALC 207 outputs an audio signal of 40 dB when an audio signal of a level of 50 dB is input.

A broken line 305 indicates an input level of an audio signal corresponding to driving noise generated by movement of the lens 201 or the driving portion such as a motor for moving the lens 201 during demagnification driving of the lens 201. For example, the level is 55 dB. More specifically, during the demagnification driving, an audio signal of a level of at least 55 dB at the lowest is input. During the demagnification driving, the ALC 207 outputs an audio signal of 40 dB when an audio signal of a level of 55 dB is input.

A broken line 306 indicates a level of an audio signal input to the ALC 207, for example, about 90 dB, which is sufficiently larger than driving noise of a driving portion for the lens 201. In a status where an audio signal of this level is input, a level of ambient sound may be high. Normally, sound of a low level becomes difficult to be heard due to sound of a high level, and, hence, driving noise of about 50 dB becomes difficult to be heard due to ambient sound of a larger level.

Thus, in the present exemplary embodiment, an audio signal of a level equal to or higher than the level of the broken line 306 where ambient sound of a level making driving noise nondistinctive may have been input is amplified by a level equal to that when no driving portion is driven. More specifically, normally, an output audio signal of a level of 90 dB is output when an audio signal of a level of 90 dB is input. Also during both of magnification driving and demagnification driving, an output audio signal of a level of 90 dB is output.

Referring to FIG. 2 and FIGS. 3A and 3B, sound level adjustment processing by the audio input unit 102 will be described.

First, sound level adjustment processing when no driving portion such as a motor for moving the lens 201 is driven (normal time) in the present exemplary embodiment will be described.

In this case, the AC conversion unit 206 converts an analog audio signal acquired by the microphone 205 into a digital audio signal to transmit the signal to the ALC 207 and the level detection unit 209. The level detection unit 209 detects a level of the input audio signal to transmit the detected level to the gain setting unit 210. The gain setting unit 210 reads a normal parameter from the gain memory 211 if no control signal indicating driving of a driving portion for the lens 201 has been received from the control unit 109. An ALC diagram corresponding to the normal parameter (parameter when no driving portion is driven) illustrates a correspondence relationship between an input level and an output level similar to the relationship 301, and a correspondence relationship between an input level and a gain similar to the relationship 307.

The gain setting unit 210 sets a gain (amplification rate or attenuation rate) in the ALC 207 based on the level of the audio signal detected by the level detection unit 209 and input to the ALC 207 and the normal parameter read from the gain memory 211. More specifically, a gain is set in the ALC 207 so that a correspondence relationship between an input level and an output level of audio signals similar to the relationship 301 illustrated in FIG. 3A can be achieved. A gain corresponding to an input level similar to the level 307 illustrated in FIG. 3B is set in the ALC 207.

The ALC 207 amplifies or attenuates the input audio signal based on the gain set by the gain setting unit 210 to transmit the processed audio signal to the audio processing unit 208. The audio processing unit 208 generates audio data by performing predetermined processing on the audio signal to transmit the generated audio data to the memory 103.

Next, sound level adjustment processing when the lens 201 is driven by the driving portion of the lens control unit 204 to move will be described. A case where the user operates the operation unit 110 to move the lens 201 for magnifying an optical image of an object (magnification driving) will be described.

When the user operates the operation unit 110 for magnification, the control unit 109 transmits a control signal to move the lens in a direction to magnify the optical image of the object to the lens control unit 204. The lens control unit 204 drives, according to the control signal, the motor so as to move the lens 201 in the direction to magnify the optical image of the object. In this case, while the lens 201 is driven to move by the driving portion, the control unit 109 transmits a control signal indicating magnification driving of the lens 201 to the gain setting unit 210.

The AD conversion unit 206 converts the analog audio signal acquired by the microphone 205 into a digital audio signal to transmit it to the ALC 207 and the level detection unit 209. The level detection unit 209 detects a level of the input audio signal to transmit it to the gain setting unit 210. Since the gain setting unit 210 has received the control signal indicating magnification driving of the lens 201 from the control unit 109, the gain setting unit 210 reads a magnification parameter from the gain memory 211. As described above, an ALC diagram corresponding to magnification driving (magnification parameter) illustrates a correspondence relationship between an input level and an output level similar to the relationship 302, and a correspondence relationship between an input level and a gain similar to the relationship 308.

The gain setting unit 210 sets a gain (amplification rate or attenuation rate) in the ALC 207 based on the level of the audio signal detected by the level detection unit 209 and input to the ALC 207 and the magnification parameter read from the gain memory 211. More specifically, a gain is set in the ALC 207 so that a correspondence relationship between an input level and an output level of audio signals similar to the relationship 302 illustrated in FIG. 3A can be achieved. Again corresponding to an input level similar to the gain 308 illustrated in FIG. 3B is set in the ALC 207.

The ALC 207 amplifies or attenuates the audio signal input based on the gain set by the gain setting unit 210 to transmit the signal to the audio processing unit 208. The audio processing unit 208 performs predetermined processing on the audio signal to form audio data, and transmits the audio data to the memory 103.

Similarly, when the user operates the zoom key of the operation unit 110 to move the lens 201, thereby demagnifying the optical image of the object (demagnification driving), the control unit 109 transmits a control signal while the lens 201 is driven by the motor of the lens control unit 204 to move. Through this control signal, the control unit 109 notifies the gain setting unit 210 of demagnification driving of the lens 201.

Having received the control signal indicating the demagnification driving of the lens 201 from the control unit 109, the gain setting unit 210 reads a demagnification parameter from the gain memory 211. As described above, an ALC diagram corresponding to the demagnification driving (demagnification parameter) illustrates a correspondence relationship between an input level and an output level similar to the relationship 303 and a correspondence relationship between an input level and a gain similar to the relationship 309. The gain setting unit 210 sets a gain (amplification rate or attenuation rate) in the ALC 207 based on the level of the audio signal detected by the level detection unit 209 and input to the ALC 207 and the demagnification parameter read from the gain memory 211. More specifically, a gain is set in the ALC 209 so as to achieve a correspondence relationship between an input level and an output level of audio signals similar to the relationship 303 illustrated in FIG. 3A. Alternatively, a gain corresponding to an input level similar to the level 309 illustrated in FIG. 3B is set in the ALC 207.

The ALC 207 amplifies or attenuates the input audio signal based on the gain set by the gain setting unit 210 to transmit the signal to the audio processing unit 208. The audio processing unit 208 performs predetermined processing on the audio signal to generate audio data, and transmits the audio data to the memory 103.

In the present exemplary embodiment, when the driving portion changes from a state of being not driven to a state of being driven, the gain in the ALC 207 is gradually changed taking several milliseconds.

Thus, in the present exemplary embodiment, while the driving portion is driven, the imaging apparatus 100 amplifies the input audio signal with an amplification rate lower than that when the driving portion is not driven as the level of the audio signal acquired by the microphone is lower. More specifically, as illustrated in FIG. 3B, as the level of the audio signal acquired by the microphone is lower, the amplification rate is set lower when the driving portion is driven than that when the driving portion is not driven so as to enlarge a difference in amplification rate therebetween. In other words, while the driving portion is driven, as the level of the audio signal acquired by the microphone is lower, the level of the audio signal after adjustment is adjusted to be lower than that when the driving portion is not driven.

With this configuration, the imaging apparatus 100 according to the present exemplary embodiment can attenuate an audio signal of a level having driving noise predicted to be distinctive when the driving portion is driven, and does not attenuate an audio signal of a level having driving noise predicted to be nondistinctive. The imaging apparatus 100 can acquire an audio signal difficult to give uncomfortable feeling to the user while reducing driving noise generated during driving of the driving portion.

In the present exemplary embodiment, while the diving portion is driven (during driving), as long as an audio signal of a level having distinctive driving noise is acquired by the microphone, an output audio signal of a level lower than that when the driving portion is not driven (normal time) is output. As long as an audio signal of a level having nondistinctive driving noise is acquired by the microphone, an output audio signal of a level approximately equal to that when the driving portion is not driven is output. Thus, during driving, an audio signal of a level having driving noise predicted to be distinctive is attenuated, while an audio signal of a level having driving noise predicted to be nondistinctive is not attenuated.

In the present exemplary embodiment, the ALC diagrams 302 and 303 illustrated in FIG. 3A have been described as examples. However, other characteristics such as 310 or 311 may be employed. More specifically, a level of an output audio signal corresponding to a level of an input audio signal may be set lower during driving than during normal time as the level of the input audio signal is lower. Similarly, the ALC diagrams 308 and 309 illustrated in FIG. 3B have been described. However, other characteristics such as 312 or 313 may be employed.

Figure 4B:
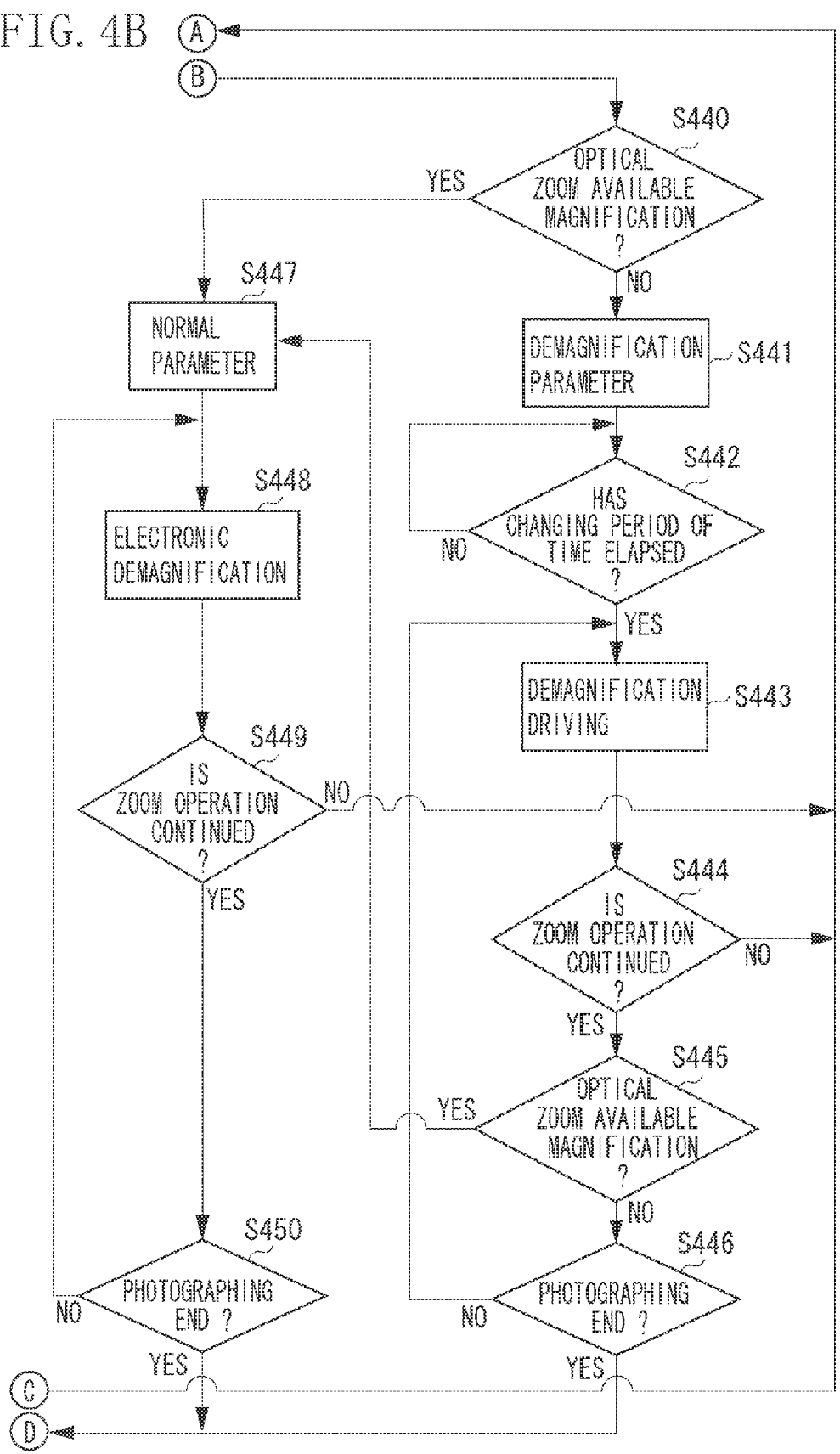

Referring to the flowcharts of FIGS. 4A and 4B, control by the control unit 109 during camera photographing will be described. In the present exemplary embodiment, an operation from when the user operates the recording button to start recording to when the user operates the recording button again to finish the recording will be described.

When photographing is started, in step S410, as described above, the control unit 109 checks which of a magnification instruction direction and a demagnification instruction direction the zoom lever is operated in, or whether the zoom lever is operated. If not operated (NO in step S410), then in step S411, the control unit 109 controls the gain setting unit 210 to read the abovementioned "normal parameter" from the gain memory 211. In step S412, the control unit 109 detects whether an instruction of a photographing end has been input. If the instruction of the photographing end has been input (YES in step S412), the control unit 109 instructs each block to finish the photographing. If no instruction of a photographing end has been input (NO in step S412), the control unit 109 returns to step S410 for detecting the operation of the zoom lever.

If the zoom lever is determined to be operated in the magnification instruction direction in step S410 (MAGNIFY in step S410), then in step S420, the control unit 109 determines whether optical zooming is set to a maximum value of available magnification. As described above, a maximum value of a magnification rate of the optical zooming by the lens 201 is SIX times during moving image photographing of the imaging unit 101 of the imaging apparatus according to the present exemplary embodiment. In step S420, the control unit 109 determines whether an optical zoom magnification is six times (YES in step S420), or lower (NO in step S420). If the magnification is six times, the lens 201 cannot be driven any more in the magnification direction, and hence no driving noise is generated in the lens with zooming. However, if the magnification is equal to or lower than six times, driving noise is generated in the lens with zooming.

If the optical zooming is lower than six times (NO in step S420), then in step S421, the control unit 109 controls the gain setting unit 210 to read the abovementioned "magnification parameter" from the gain memory 211. The gain setting unit 210 gradually changes the parameter from the read "normal parameter" to the "magnification parameter" taking several milliseconds. The gain memory 211 may store a plurality of parameters between the "normal parameter" and the "magnification parameter", and sequentially read the parameters from the "normal parameter" to the "magnification parameter". The control unit 109 controls these operations.

In step S423, when the "magnification parameter" is applied to the gain setting unit 210, the control unit 109 controls the lens control unit 204 to perform magnification by the optical zooming. In this case, in step S422, the control unit 109 inhibits magnification by the optical zooming for several milliseconds until the "magnification parameter" is applied. As a result, driving noise of the lens by the optical zooming is made nondistinctive even immediately after a start of zooming, thus improving a reduction effect.

In step S424, the control unit 109 determines whether the operation of the zoom lever detected in step S410 is continued in the magnification instruction direction. If the zooming is not continued (NO in step S424), the control unit 109 returns to step S410 to determine which of the magnification instruction direction and the demagnification instruction direction the zoom lever is operated in, or whether the zoom lever is not operated. If the zooming is continued (YES in step S424), then in step S425, the control unit 109 determines whether the optical zooming is set to a maximum value of available magnification as in the case of step S420. If the optical zooming is lower than six times (NO in step 425) as in the case of step S420, then in step S426, the control unit 109 detects whether an instruction of a photographing end has been input. If the instruction of the photographing end has been input (YES in step S426), the control unit 109 instructs each block to finish the photographing. If no instruction of a photographing end has been input (NO in step S426), the control unit 109 returns to step S423 to continue the optical zooming.

A case where the optical zooming is six times in step S420 or S425, or a case where the optical zooming is set to a maximum value of available magnification (YES in step 420 or YES in step S425) will be described. In this case, in step S427, the control unit 109 controls the gain setting unit 210 to read the "normal parameter" from the gain memory 211. In step S428, the control unit 109 magnifies the image by the abovementioned electronic zoom function. In this case, no driving noise is generated with the zooming, and hence the "normal parameter" is used.

In step S429, the control unit 109 determines whether the operation of the zoom lever detected in step S410 is continued in the magnification instruction direction as in the case of step S424. If the zooming is not continued (NO in step S429), the control unit 109 returns to step S410 to check which of the magnification instruction direction and the demagnification instruction direction the zoom lever is operated in, or whether the zoom lever is operated. If the zooming is continued (YES in step S429), then in step S430, the control unit 109 detects whether an instruction of a photographing end has been input as in the case of step S426. If the instruction of the photographing end has been input (YES in step S430), the control unit 109 instructs each block to finish the photographing. If no instruction of a photographing end has been input (NO in step S430), the control unit 109 returns to step S428 to continue the electronic zooming.

If the zoom lever is determined to be operated in the demagnification instruction direction in step S410 (DEMAGNIFY in step S410), then in step S440, the control unit 109 determines whether the optical zooming is set to a minimum value of available magnification. As described above, a minimum value of a magnification rate of the optical zooming by the lens 201 is one time during moving image photographing of the imaging unit 101 of the imaging apparatus according to the present exemplary embodiment. In step S440, the control unit 109 determines whether an optical zoom magnification is one time (YES in step S440), or higher (NO in step S440). If the magnification is one time, the lens cannot be driven any more in the demagnification direction, and hence no driving noise is generated in the lens with zooming. However, if the magnification is equal to or higher than one time, driving noise is generated in the lens with zooming.

If the optical zooming is higher than one time (NO in step S440), then in step S441, the control unit 109 controls the gain setting unit 210 to read the abovementioned "demagnification parameter" from the gain memory 211. The gain setting unit 210 gradually changes the parameter from the read "normal parameter" to the "demagnification parameter" taking several milliseconds. The gain memory 211 may store a plurality of parameters between the "normal parameter" and the "demagnification parameter", and sequentially read the parameters from the "normal parameter" to the "demagnification parameter". The control unit 109 controls these operations.

In step S443, when the "demagnification parameter" is applied to the gain setting unit 210, the control unit 109 controls the lens control unit 204 to perform demagnification by the optical zooming. In this case, in step S442, the control unit 109 inhibits demagnification by the optical zooming for several milliseconds until the "demagnification parameter" is applied. As a result, driving noise of the lens by the optical zooming is made nondistinctive even immediately after a start of zooming, thus improving a reduction effect.

In step S444, the control unit 109 determines whether the operation of the zoom lever detected in step S410 is continued in the demagnification instruction direction. If the zooming is not continued (NO in step S444), the control unit 109 returns to step S410 to determine which of the magnification instruction direction and the demagnification instruction direction the zoom lever is operated in, or whether the zoom lever is not operated. If the zooming is continued (YES in step S444), then in step S445, the control unit 109 determines whether the optical zooming is set to a minimum value of available magnification as in the case of step S440. If the optical zooming is higher than one time (NO in step 445) as in the case of step S440, then in step S446, the control unit 109 detects whether an instruction of a photographing end has been input. If the instruction of the photographing end has been input (YES in step S446), the control unit 109 instructs each block to finish the photographing. If no instruction of a photographing end has been input (NO in step S446), the control unit 109 returns to step S443 to continue the optical zooming.

A case where the optical zooming is one time in step S440 or S445, or a case where the optical zooming is set to a minimum value of available magnification (YES in step 440 or YES in step S445) will be described. In this case, in step S447, the control unit 109 controls the gain setting unit 210 to read the "normal parameter" from the gain memory 211. In step S448, the control unit 109 demagnifies the image by the abovementioned electronic zoom function. In this case, no driving noise is generated with the zooming, and hence the "normal parameter" is used.

In step S449, the control unit 109 determines whether the operation of the zoom lever detected in step S410 is continued in the demagnification instruction direction as in the case of step S444. If the zooming is not continued (NO in step S449), the control unit 109 returns to step S410 to check which of the magnification instruction direction and the demagnification instruction direction the zoom lever is operated in, or whether the zoom lever is operated. If the zooming is continued (YES in step S449), then in step S450, the control unit 109 detects whether an instruction of a photographing end has been input as in the case of step S426. If the instruction of the photographing end has been input (YES in step S450), the control unit 109 instructs each block to finish the photographing. If no instruction of a photographing end has been input (NO in step S450), the control unit 109 returns to step S448 to continue the electronic zooming.

As described above, in the imaging apparatus according to the present exemplary embodiment, the control unit 109 can switch a gain for the audio signal in the ALC 207 according to lens magnification driving or demagnification driving. The parameter is changed not after the lens is moved but before the lens is moved, and hence noise reduction processing can be executed more reliably. More specifically, changing the parameter used by the gain setting unit 210 before the optical zooming is operated enables prevention of a status where noise is not reduced for several milliseconds after the start of zooming.

The control unit 109 according to the present exemplary embodiment magnifies the optical zooming while the zoom lever is operated in the magnification instruction direction, and directly starts the electronic zooming after the optical zooming reaches the maximum value. The control unit 109 automatically controls the gain setting unit 210 from the state of reading the "magnification parameter" from the gain memory 211 to the state of reading the "normal parameter". More specifically, even if the user continues the magnification operation, the control unit 109 can automatically change the parameter of the gain setting unit 210 according to the movement of the lens 201. Thus, noise reduction can be executed only when appropriate.

In the present exemplary embodiment, the "magnification parameter" and the "demagnification parameter" are different from each other, and hence driving noise reductions respectively suited to the magnification driving and the demagnification driving can be acquired. In the present exemplary embodiment, the parameters are set to those 302 and 303 illustrated in FIG. 3A. However, the "magnification parameter" and the "demagnification parameter" may be replaced with each other. These parameters vary depending on characteristics of the zoom lens.

In the present exemplary embodiment, in steps S420, S425, S440, and S445, the maximum value of the optical zoom available magnification is six times, and the minimum value of the available demagnification is one time. However, other values may be employed. For example, in steps S420 and S425, a predetermined maximum magnification may be 5.9 or 5 times other than 6 times. In steps S440 and S445, a predetermined minimum magnification may be 2 times or 1.5 times other than 1 time. The user can designate these magnifications. Thus, when executing zooming exceeding a designated magnification, the user can perform photographing not to reduce a level of sound lower than a predetermined level by the ALC 207. More specifically, in a magnification equal to or higher, or equal to or lower than a set magnification, the user can magnify or demagnify an image while performing photographing placing priority on sound quality.

In the present exemplary embodiment, the case illustrated in FIG. 2 where the number of microphones is one has been described. However, a plurality of microphones may be used. In this case, only one ALC 207 may be provided to control a gain. When ALCs 207 are provided corresponding to the respective microphones, a noise reduction effect can be improved more. The reason is that a level of driving noise input to the microphone varies from one microphone to another due to the influence of positions of the microphones, and hence noise can be reduced individually. In this case, the number of gain memories 211 may be one.

In the present exemplary embodiment, the sound level control when the lens 201 performs the zooming operation (magnification or demagnification) (first driving method and second driving method) has been described. The same description applies to a case where a focus operation (focus adjustment) or an image stabilization operation (image shaking prevention) is performed, and a case where other driving portions are operated. In this case, having received a signal indicating execution of the focus operation or the image stabilization operation from the control unit 109, the gain setting unit 210 reads a focus parameter or an image stabilization parameter from the gain memory 211 to be used. More specifically, when operated driving portions are different between a first driving portion and a second driving portion, different parameters are read to be used. When a plurality of driving portions is simultaneously operated, a parameter corresponding to a driving portion having largest driving noise is used. In this case, a volume of driving noise varies from one apparatus to another. Hence, volumes of driving noise corresponding to respective driving operations may be compared with each other to determine a parameter to be used, or a parameter may be determined based on a preset priority.

In the present exemplary embodiment, the example where the driving noise during the magnification driving is smaller that that during the demagnification driving has been described. However, the relationship may be reverse. In the present exemplary embodiment, in FIGS. 3A and 3B, when the input level is equal to or lower than the level 306, the output level is higher in the case of using the "magnification parameter" than in the case of using the "demagnification parameter". When the levels of driving noise are reversed, the output level may be lower in the case of using the "magnification parameter" than in the case of using the "demagnification parameter".

In the present exemplary embodiment, the case where the sound of one channel is input has been described. However, the present invention can be applied to a greater number of channels.

The present exemplary embodiment has been directed to the imaging apparatus. However, the sound processing of the audio input unit 102 according to the present exemplary embodiment can be applied to any apparatus as long as the apparatus records or receives external sound. For example, the present invention may be applied to an integrated circuit (IC) recorder or a mobile phone.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Applications No. 2009-283452 filed Dec. 14, 2009 and No. 2010-056195 filed Mar. 12, 2010, which are hereby incorporated by reference herein in their entirety.

What is claimed is:

1. An imaging apparatus including a driving portion configured to move an optical system for acquiring an image of an object, the imaging apparatus comprising:
   an imaging unit configured to acquire an image signal by capturing the acquired image;
   a sound collecting unit configured to acquire an audio signal by collecting ambient sound;
   an adjustment unit configured to adjust a level of the audio signal by giving a gain according to the level of the audio signal to the audio signal and to output the adjusted audio signal;
   a driving unit configured to drive the driving portion; and
   a control unit configured to control the adjustment unit according to whether the driving unit is driving the driving portion,
   wherein the control unit controls gain given by the adjustment unit when the driving unit is not driving the driving portion higher than gain given by the adjustment unit when the driving unit is driving the driving portion, so that a difference between the gain given when the driving unit is driving the driving portion and gain given when the driving unit is not driving the driving portion larger as the level of the audio signal is lower.

2. The imaging apparatus according to claim 1, wherein the optical system includes a zoom lens;
   wherein the driving unit moves the zoom lens to magnify or demagnify the image; and
   wherein the control unit controls the adjustment unit to vary the level of the audio signal after adjustment between when the driving unit moves the zoom lens to magnify and to demagnify the image.

3. The imaging apparatus according to claim 2, wherein the control unit controls the adjustment unit to adjust, when the driving unit moves the zoom lens to magnify the image, the level of the audio signal after adjustment to be lower than the level of the audio signal after adjustment when the driving unit moves the zoom lens to demagnify the image.

4. The imaging apparatus according to claim 2, wherein the control unit controls the adjustment unit to adjust, when the driving unit moves the zoom lens to demagnify the image, the level of the audio signal after adjustment to be lower than the level of the audio signal after adjustment when the driving unit moves the zoom lens to magnify the image.

5. The imaging apparatus according to claim 3, wherein the control unit controls, when the driving unit moves the zoom lens to demagnify the image, the gain given to the audio signal to be lower than the gain given to the audio signal when the driving unit moves the zoom lens to magnify the image.

6. The imaging apparatus according to claim 4, wherein the control unit controls, when the driving unit moves the zoom lens to magnify the image, the gain given to the audio signal to be lower than the gain given to the audio signal when the driving unit moves the zoom lens to demagnify the image.

7. The imaging apparatus according to claim 1, wherein if the level of the audio signal is lower than a predetermined value, the control unit controls, when the driving unit is driving the driving portion, the gain to be lower than the gain when the driving unit is not driving the driving portion, and to output the adjusted audio signal.

8. The imaging apparatus according to claim 1, wherein if the level of the audio signal is higher than a predetermined value, the control unit controls, when the driving unit is driving the driving portion, the gain to be equal to the gain when the driving unit is not driving the driving portion, and to output the adjusted audio signal.

9. The imaging apparatus according to claim 1, wherein the driving portion includes first and second driving portions,
   wherein the driving unit drives the first and second driving portions, and
   wherein the control unit controls the gain given when the level of the audio signal is a predetermined level to differ between when the first driving portion is being driven and when the second driving portion is being driven.

10. The imaging apparatus according to claim 9, wherein when the driving unit is driving the first driving portion and the second driving portion, the control unit controls the gain given when the level of the audio signal is the predetermined level equal to the gain given when the first driving portion is being driven.

11. The imaging apparatus according to claim 10, wherein a level of sound generated by driving the first driving portion is larger than that of sound generated by driving the second driving portion.

12. A method for controlling an imaging apparatus including a driving portion configured to move an optical system for acquiring an image of an object, the method comprising:
   acquiring an image signal by capturing the acquired image;
   acquiring an audio signal by collecting ambient sound;
   adjusting a level of the audio signal by giving a gain according to the level of the audio signal to the audio signal, and outputting the adjusted audio signal;
   driving the driving portion; and
   controlling the adjusting according to whether the driving portion is being driven,
   wherein the controlling includes the gain given by the adjustment unit when the driving portion is not being driven higher than the gain given by the adjustment unit when the driving portion is being driven, so that a difference between the gain given when the driving portion is being driven and gain given when the driving portion is not being driven greater as the level of the audio signal is lower.

13. The method according to claim 12, further comprising:
   moving a zoom lens in the optical system to magnify or demagnify the image; and
   varying the level of the audio signal after adjustment between when the moving moves the zoom lens to magnify and to demagnify the image.

14. The method according to claim 13, further comprising adjusting, when the zoom lens is moved to magnify the image, the level of the audio signal after adjustment to be lower than the level of the audio signal after adjustment when the zoom lens is moved to demagnify the image.

15. The method according to claim 12, further comprising adjusting, when the zoom lens is moved to demagnify the image, the level of the audio signal after adjustment to be lower than the level of the audio signal after the adjustment when the zoom lens is moved to magnify the image.

16. The method according to claim 14, wherein the controlling, when the driving unit moves the zoom lens to demagnify the image, the gain given to the audio signal to be lower than gain given to the audio signal when the driving unit moves the zoom lens to magnify the image.

17. The method according to claim 14, wherein the controlling includes, when the driving unit moves the zoom lens to magnify the image, the gain given to the audio signal to be lower than the gain given to the audio signal when the driving unit moves the zoom lens to demagnify the image.

18. The method according to claim 12, further comprising:
controlling the gain, when the driving portion is being driven, to be lower than the gain when the driving portion is not being driven, if the level of the audio signal is lower than a predetermined value; and
outputting the adjusted audio signal.

19. The method according to claim 12, further comprising:
setting the gain, when the driving portion is being driven, to be equal to that when the driving portion is not being driven, if the level of the audio signal is higher than a predetermined value; and
outputting the adjusted audio signal.

20. The method according to claim 12, further comprising:
controlling the gain given when the level of the audio signal is a predetermined level to differ between when a first driving portion is being driven and when a second driving portion is being driven.

21. The method according to claim 20, further comprising:
when the first driving portion and the second driving portion are being driven, controlling the gain given when the level of the audio signal is the predetermined level equal to the gain given when the first driving portion is being driven.

22. The method according to claim 21, wherein a level of sound generated by driving the first driving portion is larger than that of sound generated by driving the second driving portion.

23. An imaging apparatus including a driving portion configured to move an optical system for acquiring an image of an object, the imaging apparatus comprising:
an imaging unit configured to acquire an image signal by capturing the acquired image;
a sound collecting unit configured to acquire an audio signal by collecting ambient sound;
an adjustment unit configured to adjust a level of the audio signal by giving a gain according to the level of the audio signal to the audio signal and to output the adjusted audio signal;
a driving unit configured to drive the driving portion; and
a control unit configured to control the adjustment unit according to whether the driving unit is driving the driving portion,
wherein the control unit controls a difference between the gain given when the driving portion is being driven and that the gain given when the driving portion is not being driven larger when the level of the audio signal is a second value that is smaller than a first value than when the level of the audio signal is the first value.

24. The imaging apparatus according to claim 23, wherein the optical system includes a zoom lens;
wherein the driving unit moves the zoom lens to magnify or demagnify the image; and
wherein the control unit controls the adjustment unit to vary the level of the audio signal after adjustment between when the driving unit moves the zoom lens to magnify and to demagnify the image.

25. The imaging apparatus according to claim 24, wherein the control unit controls the adjustment unit to adjust, when the driving unit moves the zoom lens to magnify the image, the level of the audio signal after adjustment to be lower than the level of the audio signal after adjustment when the driving unit moves the zoom lens to demagnify the image.

26. The imaging apparatus according to claim 24, wherein the control unit controls the adjustment unit to adjust, when the driving unit moves the zoom lens to demagnify the image, the level of the audio signal after adjustment to be lower than the level of the audio signal after adjustment when the driving unit moves the zoom lens to magnify the image.

27. The imaging apparatus according to claim 25, wherein the control unit controls, when the driving unit moves the zoom lens to demagnify the image, the gain given to the audio signal to be lower than the gain given to the audio signal when the driving unit moves the zoom lens to magnify the image.

28. The imaging apparatus according to claim 26, wherein the control unit controls, when the driving unit moves the zoom lens to magnify the image, the gain given to the audio signal to be lower than the gain given to the audio signal when the driving unit moves the zoom lens to demagnify the image.

29. The imaging apparatus according to claim 23, wherein if the level of the audio signal is lower than a predetermined value, the control unit controls, when the driving unit is driving the driving portion, the gain to be lower than the gain when the driving unit is not driving the driving portion, and to output the adjusted audio signal.

30. The imaging apparatus according to claim 23, wherein if the level of the audio signal is higher than a predetermined value, the control unit controls, when the driving unit is driving the driving portion, the gain to be equal to the gain when the driving unit is not driving the driving portion, and to output the adjusted audio signal.

31. The imaging apparatus according to claim 23, wherein the driving portion includes first and second driving portions;
wherein the driving unit drives the first and second driving portions, and
wherein the control unit controls the gain given when the level of the audio signal is a predetermined level to differ between when the first driving portion is driven and when the second driving portion is driven.

32. The imaging apparatus according to claim 31, wherein when the driving unit is driving the first driving portion and the second driving portion, the control unit controls the gain given when the level of the audio signal is the predetermined level equal to the gain given when the first driving portion is driven.

33. The imaging apparatus according to claim 32, wherein a level of sound generated by driving the first driving portion is larger than that of sound generated by driving the second driving portion.

* * * * *